May 14, 1963
R. CARMICHAEL ETAL
3,089,914
SEPARATOR FOR GALVANIC CELLS
Filed May 2, 1960
3 Sheets-Sheet 1
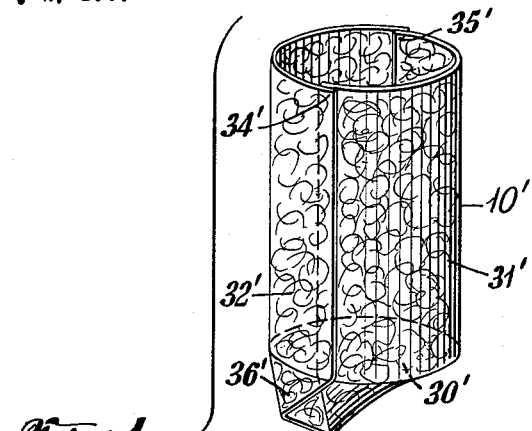
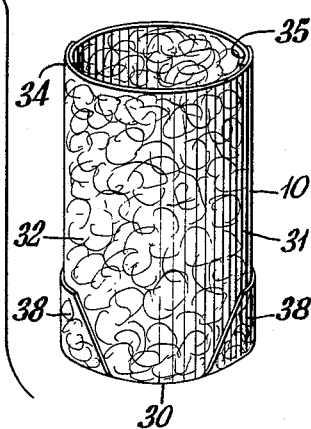
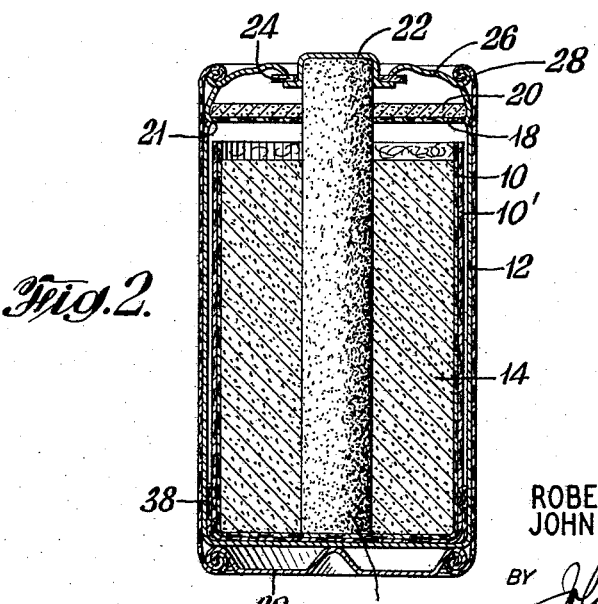
INVENTORS
ROBERT CARMICHAEL
JOHN L. S. DALEY
BY *John F. Hohmann*
ATTORNEY May 14, 1963 R. CARMICHAEL ETAL 3,089,914
SEPARATOR FOR GALVANIC CELLS
Filed May 2, 1960 3 Sheets-Sheet 2
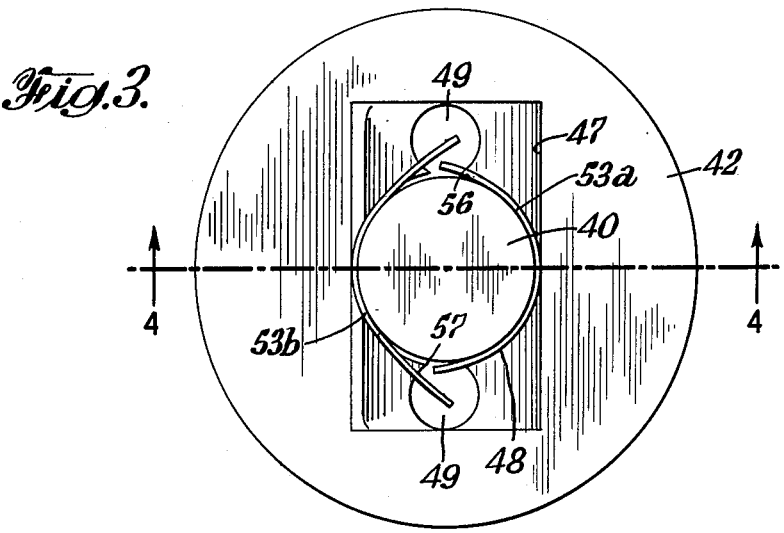
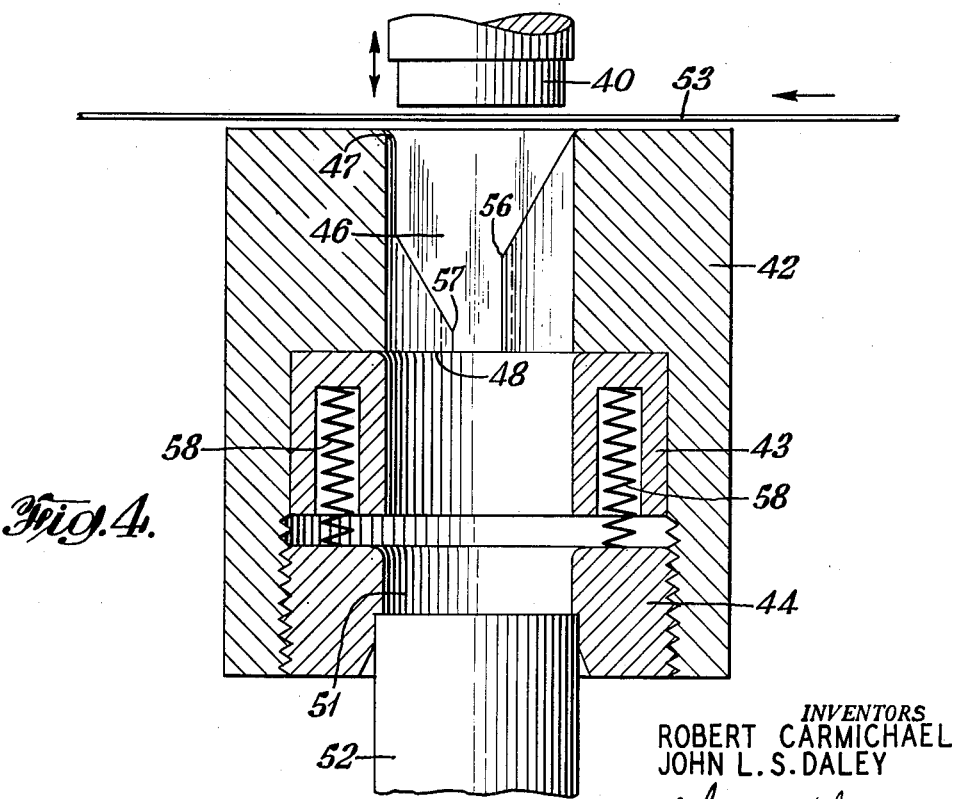
INVENTORS
ROBERT CARMICHAEL
JOHN L. S. DALEY
BY
ATTORNEY May 14, 1963 R. CARMICHAEL ETAL 3,089,914
SEPARATOR FOR GALVANIC CELLS
Filed May 2, 1960 3 Sheets-Sheet 3

INVENTORS
ROBERT CARMICHAEL
JOHN L. S. DALEY
BY
ATTORNEY

United States Patent Office 3,089,914
Patented May 14, 1963

3,089,914
SEPARATOR FOR GALVANIC CELLS
Robert Carmichael, Lakewood, and John L. S. Daley, Bay Village, Ohio, assignors to Union Carbide Corporation, a corporation of New York
Filed May 2, 1960, Ser. No. 26,242
5 Claims. (Cl. 136—143)

This invention relates to a separator construction for galvanic cells.

Although manufacturers of galvanic cells have for many years now attempted to produce a better cell having longer life, higher current drains and greater outputs by improving upon one or more elements of the cell, there still remains the need for an improved separator construction for galvanic cells.

In a conventional Leclanché dry cell, for instance, the cell construction consists of a metal container, suitably of zinc, which acts as the anode, a depolarizer mass or mix molded about a carbon rod to form a bobbin which is inserted within the metal container and a separator between the bobbin and the container. The separator serves both as a barrier against migration of particles of depolarizer mix and as an electrolyte immobilizing medium. Although the separator may be a paste, it has been found convenient and practical to employ a paper separator such as pulpboard. Conventionally, paper separators, have been made by wrapping the separator around the sides of the bobbin and by folding the separator across the bottom of the bobbin before it is inserted within the container. Ordinarily, there is also employed one or more cardboard or plastic washers at the bottom of the bobbin to lock the folded edges of the paper separator against the bottom of the container. Paper separators of this construction suffer from many disadvantages. For one, these separators because they are wrapped about the bobbin before it is inserted within the container tend to loosen. Since the paper separator must be tight to contain the particles of depolarizer mix, migration of these particles is apt to occur. Another disadvantage is the fact that the washers used at the bottom of the bobbin to lock the folds of paper separator take up space within the cell.

It is therefore an object of the invention to provide an improved separator construction for a galvanic cell.

Another object is to provide a method and apparatus for forming the separator construction in place within the container of a galvanic cell.

According to the invention, there is provided a paper separator construction for a galvanic cell which comprises at least two cupped shaped separator linings, each of which consists of a circular bottom and cylindrical side walls composed of two juxtaposed semi-cylindrical wall segments, the lateral edges of which overlap. At the bottom edge of each separator lining, folded tabs of excess separator material are formed and folded tightly against the sides of the cylindrical walls of the separator lining. The separator linings are placed one inside the other and the overlapping lateral edges of the juxtaposed wall segments of each separator lining are spaced radially apart around the circumference of the separator construction.

In the drawings:

FIG. 1 is an exploded view of the separator construction of the invention;

FIG. 2 is a vertical-sectional view of a galvanic cell embodying the invention;

FIG. 3 is a plan view of the punch and die apparatus of the invention showing the punch in position within the die;

FIG. 4 is a vertical sectional view taken along the lines 4—4 of FIG. 3 showing the punch in an elevated position;

Figure 5:
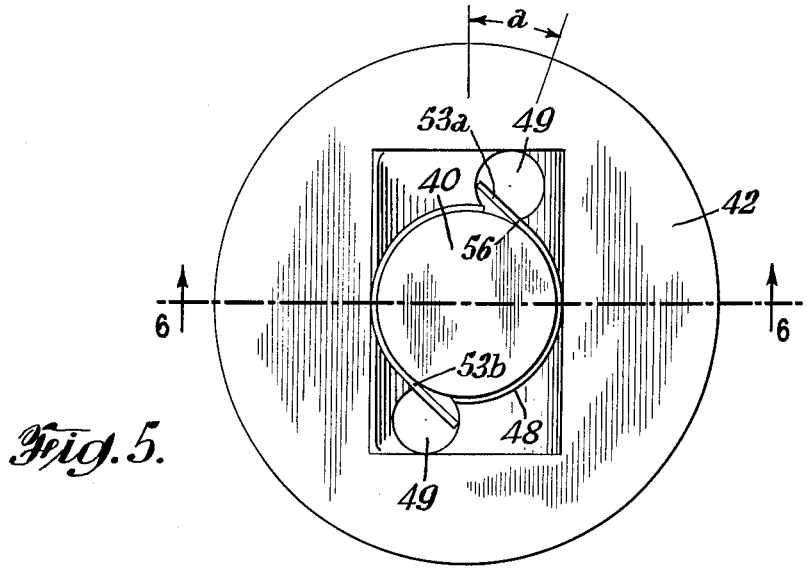
FIG. 5 is a plan view of a modification of apparatus shown in FIG. 3.

Referring to the drawings, there is shown in FIG. 1 an exploded view of a separator construction according to the invention which comprises an outer and inner cupped shaped separator lining 10, 10', suitably of pulpboard. The separator linings, 10, 10' are formed one inside the other in place within the container of a galvanic cell, such as the Leclanché dry cell shown in FIG. 2.

As shown in FIG. 2, a Leclanché dry cell of the type of construction for which the invention is well suited comprises a zinc cup electrode 12, which serves as the container for the cell, a depolarizer mix 14 and a carbon electrode 16 embedded therein, the depolarizer mix 14 and carbon electrode 16 suitably being provided in the form of a bobbin. Just below the top of the cup 12 is an inner seal comprising a disk 18, suitably of cardboard, having a hole therein through which the carbon electrode 16 passes and a soft seal 20, suitably of asphalt, both of which are held in place by the upper end of the cup 12 bent inwardly as shown at 21. The top closure for the cell comprises a flanged metal cap 22 on the top of the carbon electrode 16 which carries an insulating washer 24 on which rests the inner peripheral edge of a metal washer 26. The outer edge of the metal washer 26 is curled in liquid-tight engagement with the jacket 28, suitably of cardboard. Also shown, the jacket 28 is sealed in the same manner to a "false bottom" 29 which makes contact with the cup electrode 12.

According to the invention, a Leclanché dry cell such as shown in FIG. 2 may be provided with a separator construction comprising an outer and inner cupped shaped separator lining 10, 10', suitably of pulpboard, which are formed in place within the zinc cup electrode 12 before the bobbin is inserted.

The separator linings 10, 10', referring again to FIG. 1, are each formed from a single blank of separator material and comprise a circular bottom, shown at 30, 30', and cylindrical side walls composed of two juxtaposed, semi-cylindrical wall segments 31, 32 and 31', 32' having overlapping lateral edges 34, 35 and 34', 35' respectively. The excess separator material at the bottom edge of each separator lining 10, 10' is gathered neatly, as shown at 36', into folded tabs 38 which are folded tightly against the sides of the cylindrical side walls. The tabs 38 by being folded tightly against the cylindrical walls of the separator linings 10, 10' serve to prevent the overlapping lateral edges 34, 35 and 34', 35' from separating.

The separator construction of the invention may be composed of any number of paper separator materials, for instance, pulpboard, alpha cellulose, cellulose acetate film, pasted kraft board, methyl cellulose film and a felted non-woven paper of cellulose fibers laminated to a similar mat of vinyl fibers.

An important advantage of the separator construction is that the bottom of the outer and inner separator linings 10, 10' is of a non-folded section of separator material and that accordingly the need for one or more washers at the bottom of the separator is eliminated. The lateral overlapping edges 34, 35 and 34', 35' of each separator lining 10, 10', respectively, occupy spaced radial positions about the circumference of the cylindrical walls of the separator construction. Thus, in the event migration of particles of depolarizer mix occurs through the overlapping lateral edges 34', 35' of the inner separator lining 10', the particles will be blocked from further migration within the cell by the tightly overlying semi-cylindrical wall segments 31, 32 of the outer separator lining 10.

The separator construction possesses the added utility in that a multi-layer separator may be employed of one or more different types of separator materials. Thus, the inner separator lining 10' may be made from a separator material which has outstanding properties as a barrier and the outer lining 10 may be composed of a material which has excellent properties for immobilizing electrolyte.

Having described the separator construction of the invention and its advantages in detail, it is now in order to describe its method of formation in place within the container of a galvanic cell.

Apparatus for carrying out the method is shown in FIGS. 3–6, inclusive, and, as there shown, the apparatus comprises a cylindrical punch 40 and a die 42 having mounted therein a tab-forming pad 43 and a container mount 44.

The die 42 has a die cavity 46 which has a substantially rectangular top opening 47 and a circular bottom opening 48. The walls of the die cavity 46 are somewhat conical in configuration and have a pair of diametrically opposed guide channels 49. The openings of the guide channels 49 are located intermediate the top and bottom openings 47, 48 of the die cavity 46. The container mount 44 is threaded within the bottom end of the die 42 and has a bore 51 therein within which the open end of a galvanic cell container 52 is mounted.

In carrying out the method, the outer separator lining 10 is formed in place within the container 52 by feeding a blank 53 of separator material, such as pulpboard, between the punch 40 and the die 42 as shown in FIG. 4, the blank 53 being fed lengthwise in the direction of the arrow shown.

The blank 53 may be of any suitable size and may be fed from a continuous roll of separator material and pre-cut to the size desired. It is preferred, however, that the blank 53 be pre-cut to a length at least equivalent to twice the height plus the diameter of the container 52 and to a width of approximately 1½ to 1¾ times the diameter of the container 52. With a blank of this preferred size, the steps of cutting and trimming the separator after it has been formed in place within the container 52 are eliminated.

By the action of the punch 40, the blank 53 is advanced through the die cavity 46 as shown in FIG. 3. In this operation, several key steps are performed: (1) the blank 53 is folded into a center section beneath the face of the punch 40 and two opposed outer substantially parallel sections 53a and 53b, the width of the center section being substantially equal to the diameter of the container 52, (2) the folded outer sections 53a, 53b of the blank are shaped in a curvi-linear or arcuate fashion by the action of the punch 40 forcing the blank 53 through the conically configurated die cavity 46, thereby preforming the juxtaposed semi-cylindrical wall segments 31, 32 of the separator lining, (3) the center section of the blank 53 is drawn through the circular bottom opening 48 of the die cavity 46 by the punch 40 and the circular bottom of the separator lining thus formed, and (4) the edges of the folded outer sections 53a, 53b are advanced through the guide channels 49, as shown, so that as the semi-cylindrical wall segments 31, 32 of the separator lining are preformed, the lateral edges 34, 35 thereof begin to overlap. This is accomplished, referring particularly to FIG. 4, by the lap positioning points 56, 57 provided at the openings of the guide channels 49. It will be noted that the edges of one of the folded outer sections 53a of the blank are led through the guide channels 49 ahead of the edges of the other outer section 53b by the lap positioning point 56 which is located higher within the die cavity 46. Thus, as the blank 53 is advanced through the die cavity 46 to preform the separator lining, the lateral edges 34, 35 thereof are turned inwardly one inside the other so that they overlap.

The preformed separator lining 10 is then advanced by the punch 40 through the tab-forming pad 43 and from the pad 43 through the bore 51 in the container mount 44 to within the container 52. The excess separator material from the center section of the blank 53 which collects at the bottom edge of the separator lining as it is formed is gathered neatly into folded tabs 38 as the separator lining enters the pad 43. As the separator lining passes through the pad 43, the tabs 38 are folded tightly against the cylindrical walls of the separator lining. The tab-forming pad 43 is mounted on spring means 58 and is resiliently movable with the punch 40. Thus, the separator lining cannot tear due to the frictional resistance of the pad walls as the separator lining passes through the 43.

It should be noted that the respective diameters of the tab-forming pad 43 and the bore 51 in the container mount 44 are approximately the same as the inside diameter of the container 52 so that the separator lining 10 is formed tightly in place within the container 52.

To complete the separator construction, the die 42 is rotated to a new position preferably 90 degrees from the original position of the container 52, another blank 53 of separator material is fed between the punch 40 and die 42 and, repeating the steps above-outlined, the inner separator lining 10' is formed inside of the outer separator lining 10 within the container 52. By rotating the die 42, the overlapping lateral edges 34, 35 and 34', 35' of both separator linings 10, 10', respectively, are formed at spaced radial positions about the circumference of the cylindrical walls of the separator construction. It will, of course, be understood that several variations in the method of forming the inner separator lining 10' are possible, for instance, a second die 42 may be employed.

Figure 6:
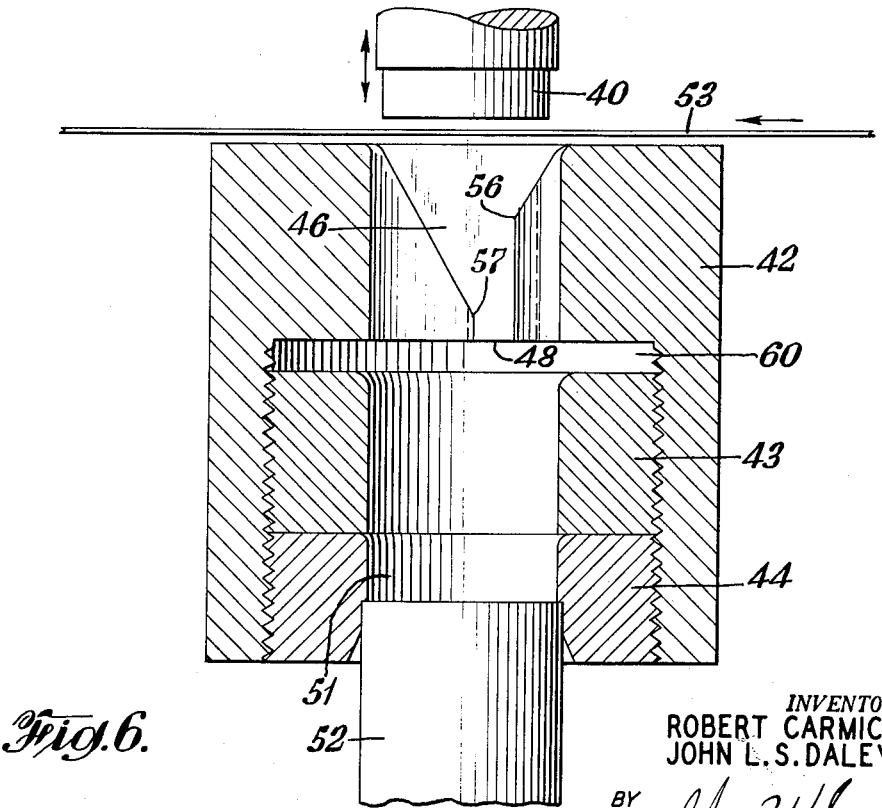
FIG. 6 is a vertical sectional view taken along the lines 6—6 of FIG. 5.

In the modification of apparatus shown in FIGS. 5 and 6, the die 42 has a die cavity 46, the guide channels 49 of which are off-set radially at an angle "a" from the diametrical axis of the die 42 normal to the direction of feed of the blank 53. The angle "a" will vary depending on the size of the container 52. By making the angle "a" equal to approximately 20 degrees, for example, in the case of an "AA" size galvanic cell container, the separator linings are formed, as shown, with only one edge of each folded outer section 53a, 53b, of the blank passing through the guide channels 49. The lead provided by the lap positioning point 56 is somewhat accentuated, it being located even high with in the die cavity 46 than is shown in FIG. 4, so that the lap positioning point 56 guides the other edge of each outer section 53a, 53b of the blank inwardly so that it does not enter the guide channels 49. In addition, the tab-forming pad 43 is mounted within the die 42 on top of the container mount 44 and spring means 58 is eliminated. A space 60 is thus provided between the pad 43 and the bottom opening 48 of the die cavity 46 to release frictional resistance on the separator lining as it passes through the die 42. Thus, by the modification of apparatus just described, the blank 53 of separator material is accommodated within the die 42 with greater facility and there is a more positive alignment of the edges of the blank 53 as it passes through the die cavity 46.

Although the separator construction of the invention has been described-herein in connection with a Leclanché dry cell, it will be understood that the separator construction is well-suited for use in many types of galvanic cells. It may, for instance, be used with success in a variety of alkaline type galvanic cells.

A number of alkaline type $MnO_2$ cells of different sizes embodying the paper separator construction of the invention were made and under similar test conditions compared with conventional cells. The separator employed in the conventional cells was constructed by double wrapping a sheet of separator material about the active mix and by folding the separator material against the bottom of the mix. A disk of polyethylene was also employed at the bottom of the mix to hold the folds of separator material in place. The separator material used in all the cells of the test was a felted, nonwoven paper laminate of cellulose fibers and vinyl fibers. In the test, the cells embodying the separator construction of the invention proved to possess a longer life than conventional cells during storage and during usage especially when subjected to abusive drain conditions.

What is claimed is:

1. In a galvanic cell, a separator construction comprising at least two cupped shaped separator linings, one of which separator linings is inserted within the other, each of said separator linings being made from a paper separator material and comprising a circular bottom composed of one piece of said separator material, cylindrical side walls composed of two juxtaposed semi-cylindrical wall segments, the lateral edges of which overlap, and folded tabs of said separator material folded against the cylindrical side walls of each separator lining, the overlapping lateral edges of said juxtaposed wall segments occupying spaced radial positions about the circumference of the separator construction.

2. A separator construction as defined by claim 1 in which said separator linings are composed of different separator materials.

3. In a galvanic cell, a separator construction comprising two cupped shaped separator linings, one of which separator linings is inserted within the other, each of said separator lining being made from a paper separator material and comprising a circular bottom composed of one piece of said separator material, cylindrical side walls composed of two juxtaposed semi-cylindrical wall segments having lateral edges, one of which lateral edges of each wall segment overlaps a lateral edge of the other of said wall segments, and folded tabs of said separator material folded against the cylindrical side walls of each separator lining, the overlapping lateral edges of said juxtaposed wall segments occupying spaced radial positions about the circumference of the separator construction.

4. A separator construction as defined by claim 3 in which the overlapping lateral edges of said juxtaposed wall segments occupy spaced radial positions approximately 90 degrees apart about the circumference of the separator constructon.

5. For use in a galvanic cell, a separator construction comprising at least two cupped shaped separator linings, one of which separator linings is inserted within the other, each of said separator linings being made from a folded blank of paper separator material and comprising a circular bottom and cylindrical side walls, said bottom being composed of a nonfolded section of said blank and said cylindrical side walls being composed of folded sections of said blank consisting of two juxtaposed semi-cylindrical wall segments, the lateral edges of which overlap, said wall segments being folded circumferentially around the periphery of said bottom with portions of said blank folded into tabs adjacent to said bottom, said tabs being folded tightly against said cylindrical side walls whereby to secure said lateral edges of said separator linlings in overlapping relation, said overlapping lateral edges being spaced apart radially around the circumference of the separator construction.

References Cited in the file of this patent
UNITED STATES PATENTS

| | | |
|---|---|---|
| 1,403,577 | Steerup | Jan. 17, 1922 |
| 1,654,038 | Diebel | Dec. 27, 1927 |
| 2,429,539 | Wood | Oct. 21, 1947 |
| 2,557,017 | Stahl | June 12, 1951 |
| 2,935,919 | O'Neil | May 10, 1960 |
| 2,953,622 | Gray | Sept. 20, 1960 |